(12) United States Patent
    Muto

(10) Patent No.: US 10,378,428 B2
(45) Date of Patent: Aug. 13, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Tomoyuki Muto, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/874,003

(22) Filed: Jan. 18, 2018

(65) Prior Publication Data

US 2018/0266307 A1    Sep. 20, 2018

(30) Foreign Application Priority Data

Mar. 16, 2017    (JP) .................................. 2017-051669

(51) Int. Cl.
    *F02B 19/08*    (2006.01)
(52) U.S. Cl.
    CPC ............. *F02B 19/08* (2013.01); *Y02T 10/125* (2013.01)
(58) Field of Classification Search
    CPC ...... F02B 19/08; F02B 23/105; F02B 23/101; F02B 2023/102; F02B 2023/103; F02B 2023/106; F02B 2023/108
    USPC ....... 123/260, 261, 262, 263, 280, 281, 283, 123/284, 285, 286, 287, 288, 297, 298
    See application file for complete search history.

(56) References Cited

U.S. PATENT DOCUMENTS

| 4,044,730 A * | 8/1977 | Masaaki ............ F02B 19/1066 123/268 |
| 4,071,001 A * | 1/1978 | Goto ................... F02B 19/1066 123/260 |
| 4,072,134 A * | 2/1978 | Noguchi ............ F02B 19/1066 123/260 |
| 4,294,209 A * | 10/1981 | Eisele ..................... F02B 19/14 123/269 |
| 5,522,357 A * | 6/1996 | Nogi ......................... F02B 1/10 123/261 |
| 8,720,411 B2 * | 5/2014 | Redtenbacher ..... F02B 19/1014 123/261 |
| 2006/0081212 A1 * | 4/2006 | Hill ...................... F02B 23/0651 123/298 |

(Continued)

FOREIGN PATENT DOCUMENTS

JP    02153221 A    6/1990
JP    06299854 A    10/1994
(Continued)

*Primary Examiner* — Hai H Huynh
(74) *Attorney, Agent, or Firm* — Sughrue Mion, PLLC

(57) ABSTRACT

An internal combustion engine includes: a main combustion chamber; an intake port connected to the main combustion chamber at an intake opening; an exhaust port connected to the main combustion chamber at an exhaust opening; a sub-chamber provided between the intake opening and the exhaust opening, and connected to the main combustion chamber through a plurality of through-holes; a fuel injector injecting fuel into the sub-chamber; and a spark plug performing ignition in the sub-chamber. A tumble flow flows from a first side to a second side as seen from the sub-chamber. The through-holes include: a first through-hole formed in a first side part of a side wall of the sub-chamber; and a second through-hole different from the first through-hole. A diameter of the first through-hole is larger than that of the second through-hole.

6 Claims, 14 Drawing Sheets

(56) References Cited

U.S. PATENT DOCUMENTS

2015/0184578 A1   7/2015   Oda et al.

FOREIGN PATENT DOCUMENTS

| JP | 08284665 A    | 10/1996 |
| JP | 2007192235 A  | 8/2007  |
| JP | 2009-215973 A | 9/2009  |
| JP | 2014062484 A  | 4/2014  |
| JP | 2015-021391 A | 2/2015  |

\* cited by examiner

INTERNAL COMBUSTION ENGINE

BACKGROUND

Technical Field

The present disclosure relates to an internal combustion engine that performs fuel injection in a sub-chamber provided in a main combustion chamber.

Background Art

Patent Literature 1 discloses an internal combustion engine that has a main combustion chamber and a sub-chamber provided in the main combustion chamber. The sub-chamber is connected to the main combustion chamber through a through-hole. A fuel injector and a spark plug are provided in the sub-chamber, and fuel injection and spark ignition are performed in the sub-chamber. Flame generated in the sub-chamber blows into the main combustion chamber through the through-hole.

Patent Literature 2 also discloses an internal combustion engine that has a main combustion chamber and a sub-chamber provided in the main combustion chamber. In the case of the internal combustion engine, a fuel injector is provided in an intake port or the main combustion chamber. In a compression stroke, a portion of a mixed gas in the main combustion chamber enters the sub-chamber through a through-hole. A spark plug is provided in the sub-chamber, and combustion is initiated by performing spark ignition in the sub-chamber. Flame generated in the sub-chamber blows into the main combustion chamber through the through-hole.

LIST OF RELATED ART

Patent Literature 1: Japanese Laid-Open Patent Publication No. 2015-21391

Patent Literature 2: Japanese Laid-Open Patent Publication No. 2009-215973

SUMMARY

In the case of the internal combustion engine disclosed in the above-mentioned Patent Literature 1, the fuel injector and the spark plug are provided in the sub-chamber, and fuel injection and spark ignition are performed in the sub-chamber. Then, the flame generated in the sub-chamber blows into the main combustion chamber and spreads in the main combustion chamber. However, if the main combustion chamber is in an excessively lean state, the flame does not spread well in the main combustion chamber, which causes deterioration in combustion stability.

An object of the present disclosure is to provide a technique that can prevent a main combustion chamber from being in an excessively lean state, regarding an internal combustion engine performing fuel injection in a sub-chamber provided in the main combustion chamber.

A first disclosure provides an internal combustion engine.

The internal combustion engine includes:

a main combustion chamber sandwiched between a cylinder head and a piston facing the cylinder head;

an intake port formed within the cylinder head and connected to the main combustion chamber at an intake opening;

an exhaust port formed within the cylinder head and connected to the main combustion chamber at an exhaust opening;

a sub-chamber provided on the cylinder head between the intake opening and the exhaust opening, and connected to the main combustion chamber through a plurality of through-holes;

a fuel injector injecting fuel into the sub-chamber; and a spark plug performing ignition in the sub-chamber.

At a position of the sub-chamber, a tumble flow flows from a first side to a second side as seen from the sub-chamber.

The plurality of through-holes include:

a first through-hole formed in a part on the first side of a side wall of the sub-chamber; and a second through-hole different from the first through-hole.

A diameter of the first through-hole is larger than a diameter of the second through-hole.

A second disclosure further has the following feature in addition to the first disclosure.

The second through-hole is formed in a part on the second side of the side wall of the sub-chamber.

A third disclosure further has the following feature in addition to the second disclosure.

The first through-hole and the second through-hole face each other.

A fourth disclosure further has the following feature in addition to the second or third disclosure.

The fuel injector preferentially injects fuel to a direction of the second side over a direction of the first side.

A fifth disclosure further has the following feature in addition to any one of the first to fourth disclosures.

There is no fuel injector in the intake port nor in the main combustion chamber.

A sixth disclosure further has the following feature in addition to any one of the first to fifth disclosures.

The fuel injector injects fuel of a first injection amount into the sub-chamber in an intake stroke.

The fuel injector injects fuel of a second injection amount less than the first injection amount into the sub-chamber after the intake stroke and before an ignition timing.

A seventh disclosure further has the following feature in addition to any one of the first to sixth disclosures.

The plurality of through-holes further include a third through-hole.

The third through-hole is provided such that the fuel injected from the fuel injector passes through the third through-hole to directly enter the main combustion chamber.

An eighth disclosure provides an internal combustion engine.

The internal combustion engine includes:

a main combustion chamber sandwiched between a cylinder head and a piston facing the cylinder head;

an intake port formed within the cylinder head and connected to the main combustion chamber at an intake opening;

an exhaust port formed within the cylinder head and connected to the main combustion chamber at an exhaust opening;

a sub-chamber provided on the cylinder head between the intake opening and the exhaust opening, and connected to the main combustion chamber through a plurality of through-holes;

a fuel injector injecting fuel into the sub-chamber; and a spark plug performing ignition in the sub-chamber.

The plurality of through-holes include:

a first through-hole formed in a part on a side of the intake opening of a side wall of the sub-chamber; and a second through-hole different from the first through-hole.

A diameter of the first through-hole is larger than a diameter of the second through-hole.

According to the first disclosure, the fuel injector is provided in the sub-chamber, and fuel injection is performed in the sub-chamber. At a position of the sub-chamber, the tumble flow flows from the first side to the second side as seen from the sub-chamber. Moreover, the first through-hole larger than another through-hole is formed in the first side part of the side wall of the sub-chamber. Since the comparatively-large first through-hole is formed on the first side, it is possible to efficiently introduce the tumble flow into the sub-chamber. When the tumble flow enters the sub-chamber through the first through-hole, a mixed gas in the sub-chamber is pushed out into the main combustion chamber through another through-hole. In other words, it is possible by utilizing the tumble flow to efficiently spread the mixed gas in the sub-chamber to the main combustion chamber. Therefore, the main combustion chamber is prevented from being in an excessively lean state. As a result, during the combustion, the flame blowing out from the sub-chamber into the main combustion chamber spreads very well in the main combustion chamber. That is, excellent combustion stability can be achieved.

According to the second disclosure, the tumble flow introduced through the first through-hole into the sub-chamber can easily flow out through the second through-hole on the second side. In other words, stream along a direction of the tumble flow is smoothly generated in the sub-chamber. Since the stream along the direction of the tumble flow is generated in the sub-chamber, the mixed gas in the sub-chamber can spread more efficiently to the main combustion chamber.

According to the third disclosure, the first through-hole on the first side and the second through-hole on the second side face each other. In this case, it is possible to most efficiently spread the mixed gas in the sub-chamber to the main combustion chamber.

According to the fourth disclosure, it is possible to efficiently perform the fuel injection, by considering the direction of the tumble flow flowing from the first side to the second side.

According to the fifth disclosure, no fuel injector is provided in the intake port nor in the main combustion chamber. Since the mixed gas in the sub-chamber is efficiently spread to the main combustion chamber, there is no need to separately install an additional fuel injector in the main combustion chamber nor in the intake port. Since it is not necessary to individually control a plurality of fuel injectors, fuel injection control becomes simple. Moreover, since it is enough to provide a single fuel injector in the sub-chamber, manufacturing costs can be reduced.

According to the sixth disclosure, it is possible to form a rich mixed gas in the sub-chamber before the ignition timing. As a result, ignitability in the sub-chamber improves, which makes it possible to well generate initial flame.

According to the seventh disclosure, the fuel injected from the fuel injector passes through the third through-hole to directly enter the main combustion chamber. By using both the first through-hole and the third through-hole, it is possible to further efficiently introduce the mixed gas and the fuel to the main combustion chamber.

According to the eighth disclosure, the fuel injector is provided in the sub-chamber, and fuel injection is performed in the sub-chamber. The first through-hole larger than another through-hole is formed in the intake side part of the side wall of the sub-chamber. In general, a direction of a tumble flow in the vicinity of the sub-chamber is from the intake side to the exhaust side. Since the comparatively-large first through-hole is formed on the intake side, it is possible to efficiently introduce the tumble flow into the sub-chamber. When the tumble flow enters the sub-chamber through the first through-hole, a mixed gas in the sub-chamber is pushed out into the main combustion chamber through another through-hole. In other words, it is possible by utilizing the tumble flow to efficiently spread the mixed gas in the sub-chamber to the main combustion chamber. Therefore, the main combustion chamber is prevented from being in an excessively lean state. As a result, during the combustion, the flame blowing out from the sub-chamber into the main combustion chamber spreads very well in the main combustion chamber. That is, excellent combustion stability can be achieved.

EMBODIMENTS

Embodiments of the present disclosure will be described below with reference to the attached drawings.

1. First Embodiment 1-1. Basic Configuration

Figure 1:
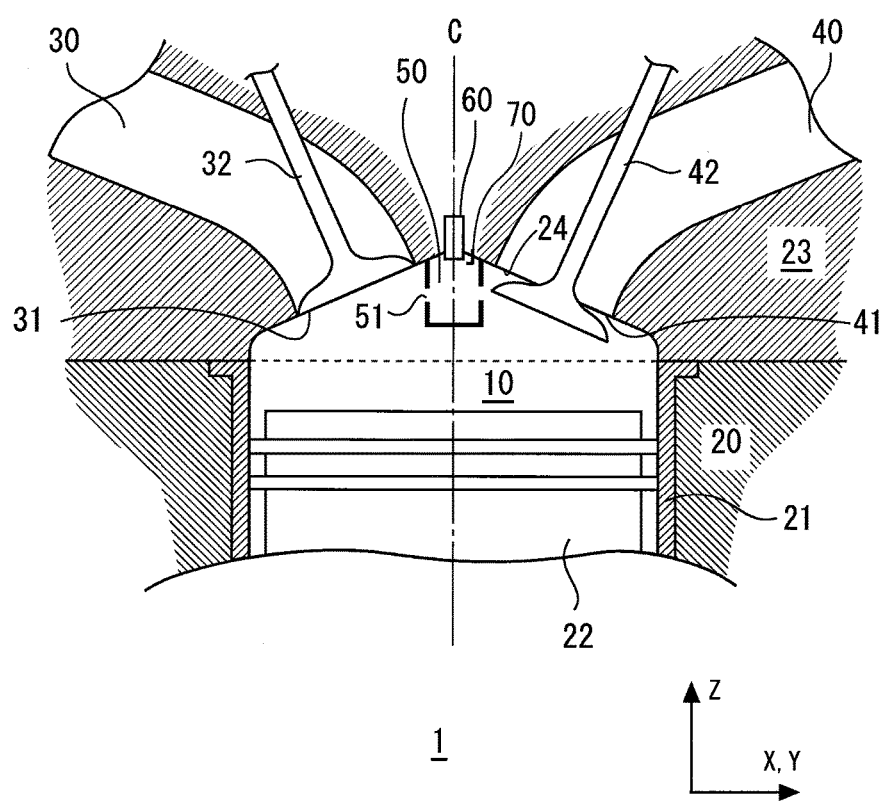
FIG. 1 is a cross-sectional diagram schematically showing a configuration example of an internal combustion engine according to a first embodiment of the present disclosure.

FIG. 1 is a cross-sectional diagram schematically showing a configuration example of an internal combustion engine 1 according to a first embodiment of the present disclosure. The internal combustion engine 1 is provided with a main combustion chamber 10, an intake port 30, an exhaust port 40, a sub-chamber 50, a fuel injector 60, and a spark plug 70 as major components.

The main combustion chamber 10 is a space surrounded by a cylinder block 20, a piston 22, and a cylinder head 23. More specifically, the cylinder block 20 includes a cylindrical cylinder liner 21 (cylinder bore) that forms a side wall of the main combustion chamber 10. In the diagram, a central axis of the cylindrical cylinder liner 21 is denoted by a reference numeral "C". The piston 22 is provided so as to reciprocate in the axis direction of the cylinder liner 21. An upper surface of the piston 22 forms a bottom surface of the main combustion chamber 10. The cylinder head 23 is placed on the cylinder block 20 so as to face the piston 22. A head bottom surface 24 being a bottom surface of the cylinder head 23 forms an upper surface of the main combustion chamber 10. The piston 22 and the cylinder head 23 (the head bottom surface 24) face each other, and the main combustion chamber 10 is sandwiched between the piston 22 and the cylinder head 23.

Here, let us define a coordinate system used in the description below. A "Z-direction" is a direction in which the piston 22 moves and parallel to the central axis C. An "XY plane" is a plane perpendicular to the Z-direction.

The intake port 30 is used for supplying intake gas to the main combustion chamber 10. More specifically, the intake port 30 is formed within the cylinder head 23 and connected to the main combustion chamber 10. An opening of the intake port 30 to the main combustion chamber 10 is an intake opening 31. That is, the intake port 30 is connected to the main combustion chamber 10 at the intake opening 31. An intake valve 32 is provided at the intake opening 31 so as to be openable and closable.

The exhaust port 40 is used for emitting exhaust gas from the main combustion chamber 10. More specifically, the exhaust port 40 is formed within the cylinder head 23 and connected to the main combustion chamber 10. An opening of the exhaust port 40 to the main combustion chamber 10 is an exhaust opening 41. That is, the exhaust port 40 is connected to the main combustion chamber 10 at the exhaust opening 41. An exhaust valve 42 is provided at the exhaust opening 41 so as to be openable and closable.

The sub-chamber 50 is placed in the main combustion chamber 10. More specifically, the sub-chamber 50 is provided on the cylinder head 23 (i.e. the head bottom surface 24) between the intake opening 31 and the exhaust opening 41, as shown in FIG. 1. Although the sub-chamber 50 projects into the main combustion chamber 10 from the cylinder head 23, it does not come in contact with the piston 22 at the top dead center (TDC). Furthermore, the sub-chamber 50 has a plurality of through-holes 51 connected to the main combustion chamber 10. In other words, the sub-chamber 50 is connected to the main combustion chamber 10 through the plurality of through-holes 51.

The fuel injector 60 is provided so as to inject fuel into the sub-chamber 50. More specifically, the fuel injector 60 is attached to the top (on the side of the cylinder head 23) of the sub-chamber 50. In the example shown in FIG. 1, the fuel injector 60 is provided near the central axis C so as to project into the sub-chamber 50 from the cylinder head 23.

The spark plug 70 is provided so as to be capable of performing spark ignition in the sub-chamber 50. That is, the internal combustion engine 1 according to the present embodiment employs a method that performs spark ignition in the sub-chamber 50 to initiate combustion.

Figure 2:
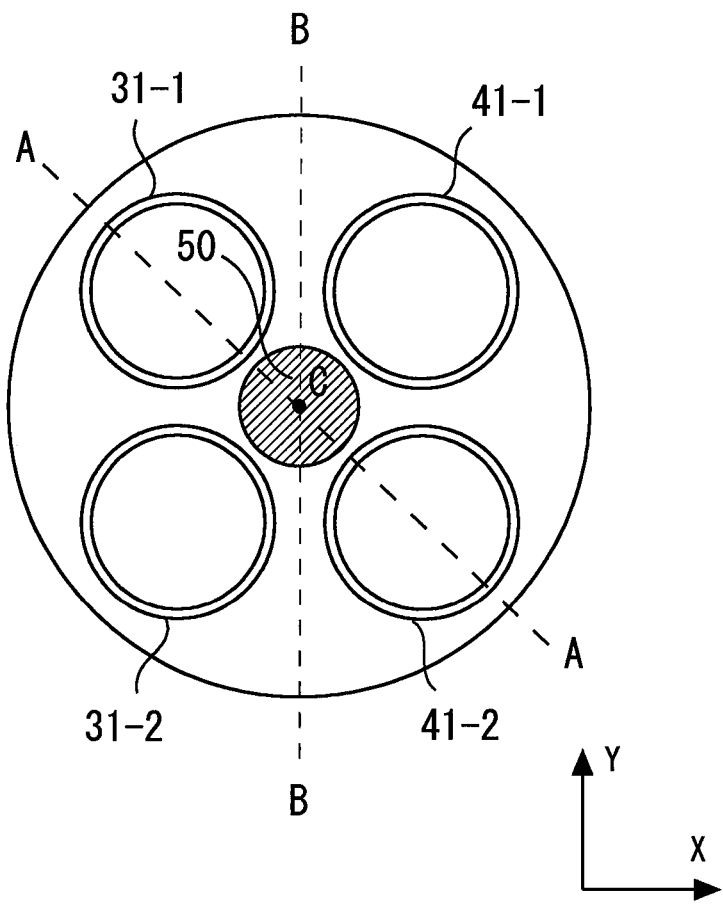
FIG. 2 is a plan view schematically showing a configuration example of the internal combustion engine according to the first embodiment of the present disclosure.

FIG. 2 shows an example of an arrangement of the intake opening 31, the exhaust opening 41, and the sub-chamber 50 in the XY plane, namely, when viewed from the Z-direction.

In the arrangement example shown in FIG. 2, a plurality of intake openings 31-1 and 31-2 and a plurality of exhaust openings 41-1 and 41-2 are provided for the single main combustion chamber 10. The intake openings 31-1 and 31-2 and the exhaust openings 41-1 and 41-2 are arranged around the central axis C of the main combustion chamber 10. The sub-chamber 50 is arranged near the central axis C of the main combustion chamber 10. That is, the sub-chamber 50 is surrounded by the intake openings 31-1 and 31-2 and the exhaust openings 41-1 and 41-2.

It should be noted that the foregoing FIG. 1 corresponds to the cross-sectional diagram along a line A-A in FIG. 2. A line B-B in FIG. 2 separates the intake side from the exhaust side. The line B-B is parallel to the Y-direction and passes through a position of the sub-chamber 50. A side on which the intake openings 31-1 and 31-2 exist as seen from the line B-B (i.e. from the sub-chamber 50) is the "intake side". On the other hand, a side on which the exhaust openings 41-1 and 41-2 exist as seen from the line B-B (i.e. from the sub-chamber 50) is the "exhaust side".

A basic combustion process in the internal combustion engine 1 according to the present embodiment described above is as follows.

Figure 3:
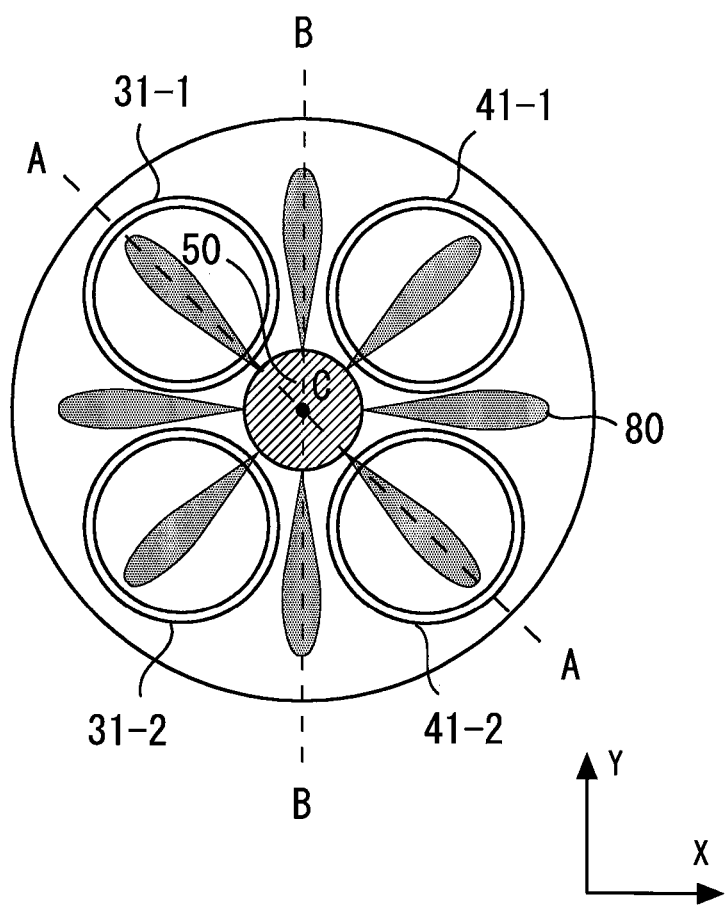
FIG. 3 is a conceptual diagram for explaining combustion in the internal combustion engine according to the first embodiment of the present disclosure.

In intake and compression strokes, fuel is injected from the fuel injector 60 into the sub-chamber 50, and a mixed gas is formed in the sub-chamber 50. A portion of the mixed gas is supplied to the main combustion chamber 10 through the through-hole 51 of the sub-chamber 50. Then, at a predetermined ignition timing, the spark plug 70 performs the spark ignition in the sub-chamber 50. As a result, combustion is initiated and initial flame is generated in the sub-chamber 50. Then, as shown in FIG. 3, the flame generated in the sub-chamber 50 vigorously blows into the main combustion chamber 10 through the through-hole 51. The flame blowing out from the sub-chamber 50 into the main combustion chamber 10 through the through-hole 51 is also called jet 80. The high-energy jet 80 spreads in the main combustion chamber 10 and thus the combustion progresses in the main combustion chamber 10.

1-2. Configuration of Sub-Chamber

According to the present embodiment, as described above, the fuel injector 60 and the spark plug 70 are provided in the sub-chamber 50, and the fuel injection and the spark ignition are performed in the sub-chamber 50. Then, the flame generated in the sub-chamber 50 blows, as the jet 80, into the main combustion chamber 10 and spreads in the main combustion chamber 10. By utilizing the sub-chamber 50 and the jet 80 in this manner, it is possible to achieve lean combustion as a whole.

However, if the main combustion chamber 10 is in an excessively lean state, the jet 80 does not spread well, which causes deterioration in combustion stability. In order to grow the jet 80 well, it is necessary to form a certain amount of mixed gas not only in the sub-chamber 50 but also in the main combustion chamber 10. Here, it may be considered to install another fuel injector for injecting fuel into the main combustion chamber 10 or the intake port 30, in addition to the fuel injector 60 in the sub-chamber 50. In that case, however, it is necessary to individually control the plurality of fuel injectors, and thus fuel injection control becomes complicated. Furthermore, manufacturing costs increase. In view of the above, in the present embodiment, we consider a technique that uses only the fuel injector 60 in the sub-chamber 50 to successfully distribute the fuel, which is injected from the fuel injector 60 into the sub-chamber 50, to the main combustion chamber 10.

In particular, in the present embodiment, we consider a technique that efficiently transfers (spreads) the mixed gas formed in the sub-chamber 50 to the main combustion chamber 10. To that end, according to the present embodiment, a "tumble flow" in the vicinity of the sub-chamber 50 is utilized.

Figure 4:
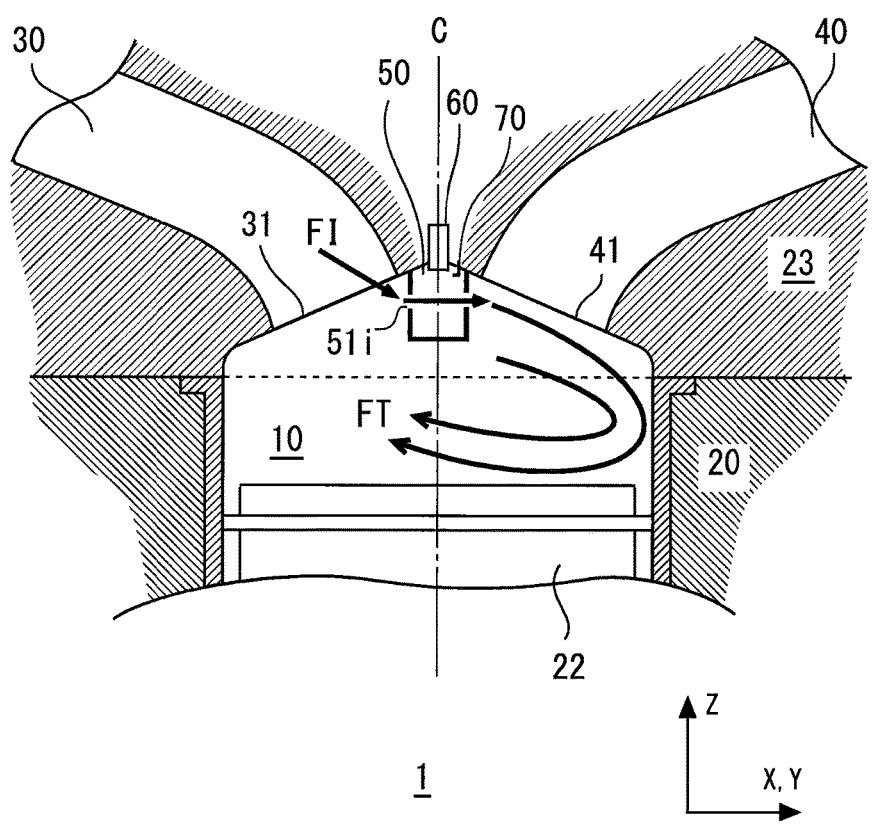
FIG. 4 is a conceptual diagram for explaining a tumble flow in a main combustion chamber of the internal combustion engine according to the first embodiment of the present disclosure.

FIG. 4 is a conceptual diagram for explaining a tumble flow FT in the main combustion chamber 10. A format of FIG. 4 is the same as that of the foregoing FIG. 1, and illustration of the intake valve 32 and the exhaust valve 42 is omitted. In an intake stroke, the intake gas is supplied from the intake port 30 to the main combustion chamber 10. As a result, an intake gas flow FI is generated in the vicinity of the intake opening 31 and the tumble flow FT is generated in the main combustion chamber 10. In the example shown in FIG. 4, a direction of the tumble flow FT in the vicinity of the sub-chamber 50 in the main combustion chamber 10 is from the intake side to the exhaust side.

According to the present embodiment, the tumble flow FT is introduced into the sub-chamber 50 to efficiently spread the mixed gas in the sub-chamber 50 to the main combustion chamber 10. In the example shown in FIG. 4, the direction of the tumble flow FT in the vicinity of the sub-chamber 50 is from the intake side to the exhaust side. In order to introduce such the tumble flow FT into the sub-chamber 50, it is important that the through-hole 51 exists at least on the intake side of the sub-chamber 50. The through-hole 51 on the intake side for taking in the tumble flow FT is hereinafter referred to as a "first through-hole 51$i$".

Figure 5:
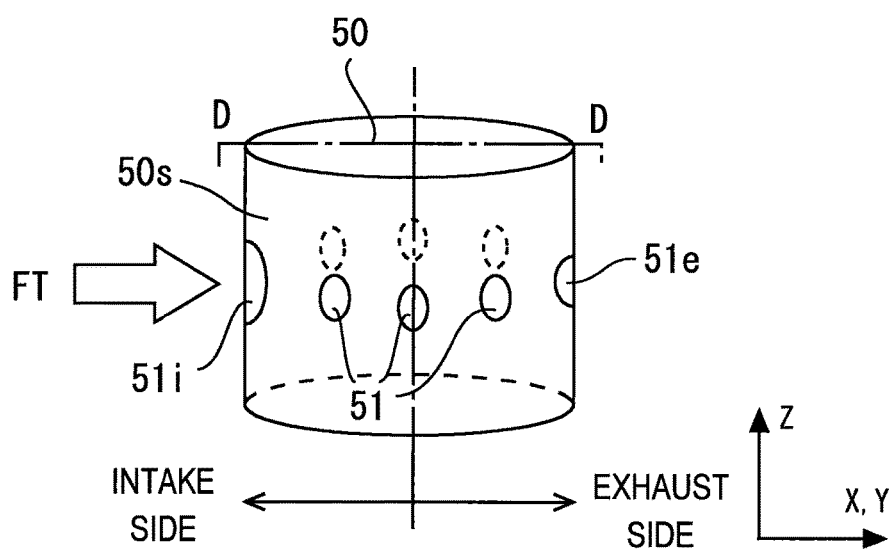
FIG. 5 is a perspective view showing a configuration example of a sub-chamber of the internal combustion engine according to the first embodiment of the present disclosure.

FIG. 5 is a perspective view showing a configuration example of the sub-chamber 50 according to the present embodiment. A side wall 50$s$ of the sub-chamber 50 is parallel to the Z-direction and perpendicular to the XY plane. The plurality of through-holes 51 are formed in the side wall 50$s$. The plurality of through-holes 51 include the first through-hole 51$i$ described above. In order to introduce the tumble flow FT flowing from the intake side to the exhaust side into the sub-chamber 50, the first through-hole 51$i$ is formed in the intake side part of the side wall 50$s$ of the sub-chamber 50.

Moreover, as shown in FIG. 5, the first through-hole 51$i$ is larger than other through-holes 51 (second through-holes). The reason is as follows. In order to efficiently transfer the mixed gas in the sub-chamber 50 to the main combustion chamber 10, it is preferable to introduce as much tumble flow FT as possible into the sub-chamber 50. From this point of view, the first through-hole 51$i$ is formed to be comparatively large. Meanwhile, from a viewpoint of blast of the jet 80 after the spark ignition, it is preferable that a diameter (i.e. a size) of the through-hole 51 is small. The reason is that as the diameter of the through-hole 51 becomes larger, momentum of the jet 80 blowing out through the through-hole 51 becomes weaker. In view of the above, according to the present embodiment, the first through-hole 51$i$ is formed such that its diameter (size) is larger than diameters of the other through-holes 51. As a result, it is possible to efficiently introduce the tumble flow FT into the sub-chamber 50 while securing the momentum of the jet 80.

Figure 6:
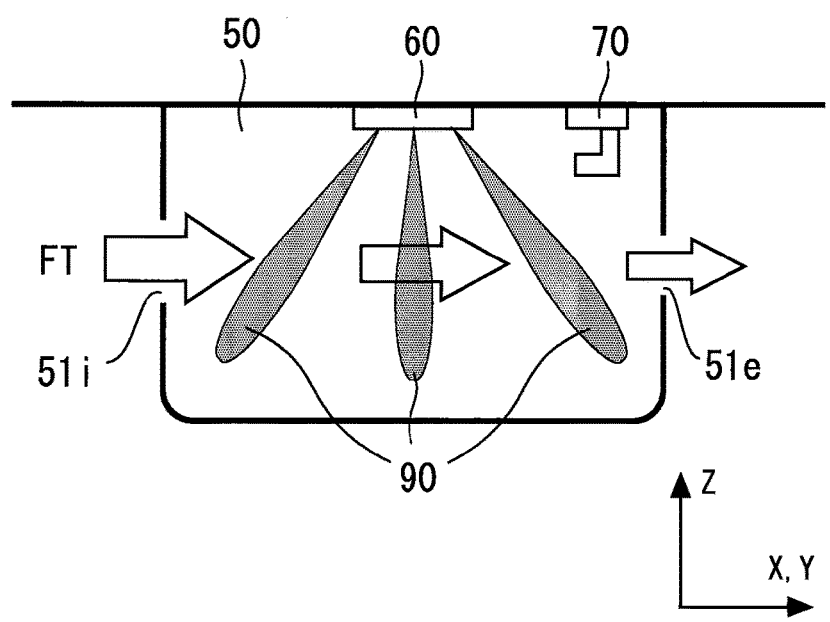
FIG. 6 is a cross-sectional diagram for explaining fuel injection and fuel spreading in the sub-chamber of the internal combustion engine according to the first embodiment of the present disclosure.

FIG. 6 is a cross-sectional diagram for explaining fuel injection and fuel spreading in the sub-chamber 50 according to the present embodiment. A cross-sectional structure of the sub-chamber 50 along a line D-D in FIG. 5, namely, a cross-sectional structure including the first through-hole 51$i$ is schematically shown in FIG. 6. The tumble flow FT in the main combustion chamber 10 is introduced into the sub-chamber 50 through the first through-hole 51$i$. When the tumble flow FT enters the sub-chamber 50, the gas in the sub-chamber 50 is pushed out into the main combustion chamber 10 through other through-holes 51 accordingly. That is to say, stream (flow) is generated in the sub-chamber 50. Under this situation, the fuel injector 60 injects fuel into the sub-chamber 50. The fuel injected from the fuel injector 60 is typically in a sprayed state and denoted by a reference numeral "90" in the drawing. A mixed gas of the sprayed fuel 90 and air is carried out by the stream in the sub-chamber 50 to be efficiently transferred (spread) into the main combustion chamber 10.

In the example shown in FIGS. 5 and 6, the through-holes 51 other than the first through-hole 51$i$ include an exhaust-side through-hole 51$e$. The exhaust-side through-hole 51$e$ is formed in the exhaust side part of the side wall 50$s$ of the sub-chamber 50. When there is the exhaust-side through-hole 51$e$, the tumble flow FT introduced into the sub-chamber 50 through the first through-hole 51$i$ on the intake side can easily flow out through the exhaust-side through-hole 51$e$. In other words, stream along the direction of the tumble flow FT is smoothly generated in the sub-chamber 50. When the stream along the direction of the tumble flow FT is generated in the sub-chamber 50, the mixed gas in the sub-chamber 50 can move (spread) more efficiently to the main combustion chamber 10, which is preferable. In particular, when the first through-hole 51$i$ and the exhaust-side through-hole 51$e$ face each other as shown in FIGS. 5 and 6, it is possible to most efficiently transfer the mixed gas in the sub-chamber 50 to the main combustion chamber 10.

Figure 7:
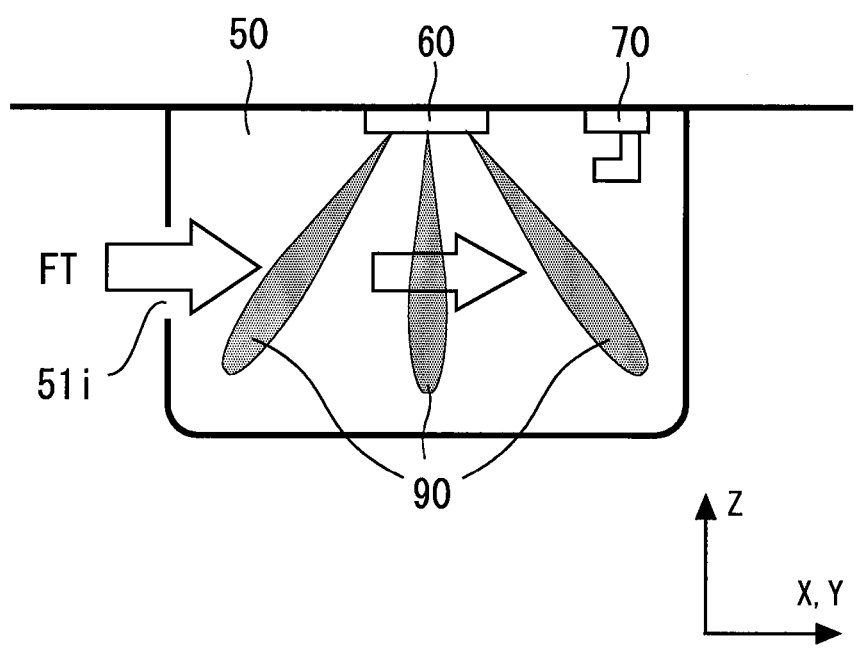
FIG. 7 is a cross-sectional diagram for explaining another example of fuel injection and fuel spreading in the sub-chamber of the internal combustion engine according to the first embodiment of the present disclosure.

However, the exhaust-side through-hole 51$e$ is not indispensable. For example, FIG. 7 shows a case where there is no exhaust-side through-hole 51$e$ at the position facing the first through-hole 51$i$. Even in this case, when the tumble flow FT enters the sub-chamber 50 through the first through-hole 51$i$, the mixed gas in the sub-chamber 50 is pushed out into the main combustion chamber 10 through another through-hole 51. That is, it is possible to obtain the action and effect that the tumble flow FT is utilized to efficiently spread the mixed gas in the sub-chamber 50 to the main combustion chamber 10.

The direction of the tumble flow FT at the position of the sub-chamber 50 is not necessarily the same as that in the example shown in FIG. 4. For example, at the position of the sub-chamber 50, the tumble flow FT may flow from the exhaust side to the intake side. When generalizing the above, the tumble flow FT at the position of the sub-chamber 50 flows from a first side to a second side as seen from the sub-chamber 50. In this case, the first through-hole 51i is formed in the first side part of the side wall 50s of the sub-chamber 50.

1-3. Example of Fuel Injection Control

Figure 8:
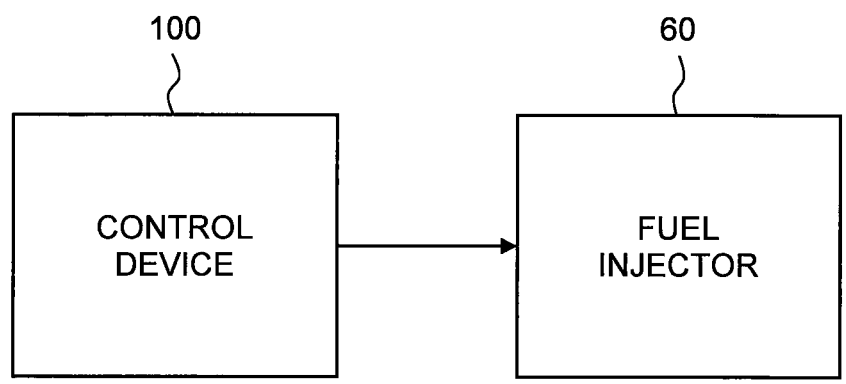
FIG. 8 is a block diagram showing a configuration relating to fuel injection control in the internal combustion engine according to the first embodiment of the present disclosure.

Next, we describe an example of fuel injection control in the internal combustion engine 1 according to the present embodiment. FIG. 8 is a block diagram showing a configuration relating to the fuel injection control according to the present embodiment. The fuel injection control is performed by a control device 100 of the internal combustion engine 1. The control device 100 is a microcomputer provided with a processor, a memory, and an input/output interface, and is also called an ECU (Electronic Control Unit). The control device 100 controls the fuel injection from the fuel injector 60.

Figure 9:
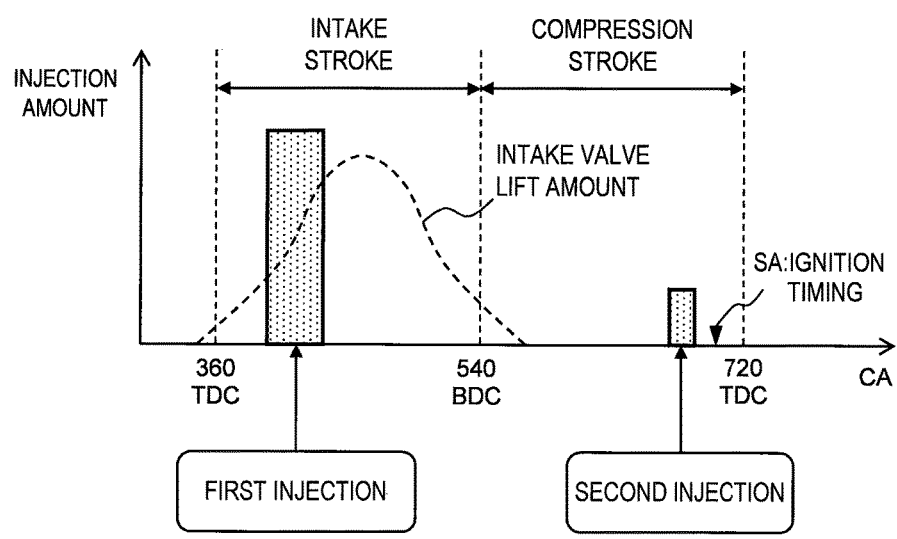
FIG. 9 is a timing chart showing an example of fuel injection control in the internal combustion engine according to the first embodiment of the present disclosure.

FIG. 9 is a timing chart showing an example of the fuel injection control according to the present embodiment. A horizontal axis represents a crank angle, and a vertical axis represents the amount of fuel injected from the fuel injector 60. In the present embodiment, the control device 100 performs the fuel injection multiple times during one engine cycle. In the example shown in FIG. 9, the control device 100 performs the fuel injection twice during one engine cycle.

More specifically, the control device 100 performs the first fuel injection in an intake stroke. In the first fuel injection, the fuel injector 60 injects fuel of a first injection amount into the sub-chamber 50. As a result, the mixed gas of the sprayed fuel 90 and air is formed in the sub-chamber 50. A portion of the mixed gas spreads to the main combustion chamber 10 through the through-hole 51 of the sub-chamber 50 (see FIGS. 6 and 7).

After that, the control device 100 performs the second fuel injection in a compression stroke. More specifically, the control device 100 performs the second fuel injection immediately before an ignition timing SA. In the second fuel injection, the fuel injector 60 injects fuel of a second injection amount into the sub-chamber 50. The second injection amount is a minute amount and less than the first injection amount in the first fuel injection.

It should be noted that the number of times of the fuel injection during one engine cycle is not limited to two. The fuel injection may be performed three times or more during one engine cycle. In either case, the control device 100 performs the last fuel injection immediately before the ignition timing SA to supply a minute amount of fuel to the sub-chamber 50.

According to the present embodiment, as described above, the fuel injection is performed immediately before the ignition timing SA to supply a minute amount of fuel to the sub-chamber 50. As a result, the ignition is performed under a condition that a rich mixed gas is formed in the sub-chamber 50. Accordingly, ignitability in the sub-chamber 50 improves, which makes it possible to well generate the initial flame. The reason why such the fuel injection control is possible is that the fuel injector 60 is provided in the sub-chamber 50. That is, providing the fuel injector 60 in the sub-chamber 50 makes it possible to form a rich mixed gas in the sub-chamber 50 while achieving lean combustion as a whole.

1-4. Effects

According to the present embodiment, the fuel injector 60 is provided in the sub-chamber 50, and the fuel injection is performed in the sub-chamber 50. At the position of the sub-chamber 50, the tumble flow FT flows from the first side to the second side as seen from the sub-chamber 50. Moreover, the first through-hole 51i larger than another through-hole 51 is formed in the first side part of the side wall 50s of the sub-chamber 50. Since the comparatively-large first through-hole 51i exists on the first side, it is possible to efficiently introduce the tumble flow FT into the sub-chamber 50. When the tumble flow FT enters the sub-chamber 50 through the first through-hole 51i, the mixed gas in the sub-chamber 50 is pushed out into the main combustion chamber 10 through another through-hole 51. In other words, it is possible by utilizing the tumble flow FT to efficiently spread the mixed gas in the sub-chamber 50 to the main combustion chamber 10. Therefore, the main combustion chamber 10 is prevented from being in an excessively lean state. As a result, during the combustion, the jet 80 blowing out from the sub-chamber 50 into the main combustion chamber 10 spreads very well in the main combustion chamber 10. That is, excellent combustion stability can be achieved.

Moreover, according to the present embodiment, since the mixed gas in the sub-chamber 50 is efficiently spread to the main combustion chamber 10, there is no need to separately install an additional fuel injector in the main combustion chamber 10 nor in the intake port 30. By providing the fuel injector 60 only in the sub-chamber 50 and injecting the fuel from the fuel injector 60 into the sub-chamber 50, it is possible to well form the mixed gas in the main combustion chamber 10 as well. Since it is not necessary to individually control a plurality of fuel injectors, the fuel injection control becomes simple. Moreover, since it is enough to provide the single fuel injector 60 in the sub-chamber 50, manufacturing costs can be reduced.

Furthermore, according to the present embodiment, since the fuel injector 60 is provided in the sub-chamber 50, it is possible to form a rich mixed gas in the sub-chamber 50. In particular, by performing the fuel injection immediately before the ignition timing SA, it is possible to perform the ignition under a condition that the rich mixed gas is formed in the sub-chamber 50. As a result, the ignitability in the sub-chamber 50 improves, which makes it possible to well generate the initial flame.

2. Second Embodiment

In a second embodiment of the present disclosure, the fuel injected from the fuel injector 60 into the sub-chamber 50 passes through at least a part of the through-holes 51 to directly enter the main combustion chamber 10. The through-hole 51 through which the fuel injected from the fuel injector 60 passes directly is hereinafter referred to as a "direct injection through-hole 51d".

Figure 10:
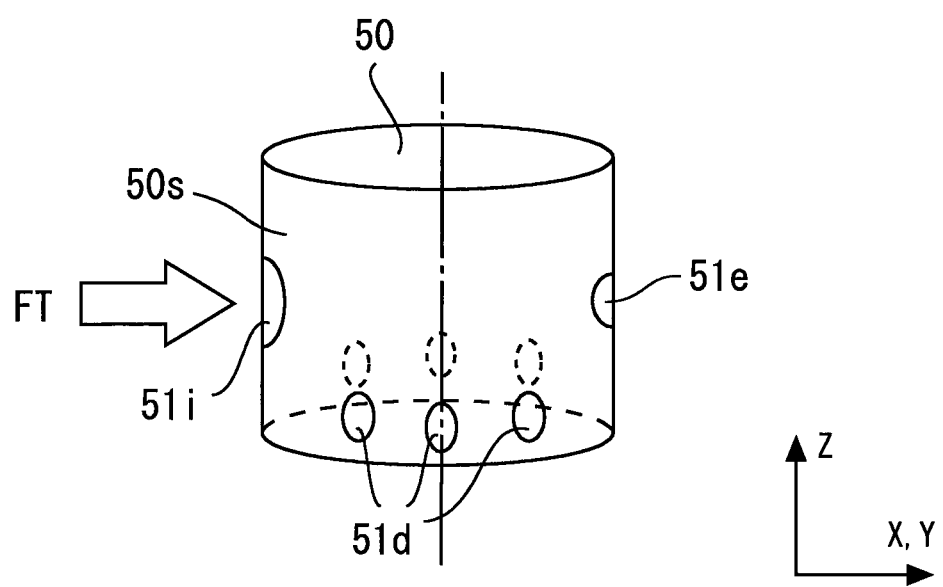
FIG. 10 is a perspective view showing a configuration example of the sub-chamber of the internal combustion engine according to a second embodiment of the present disclosure.

FIG. 10 is a perspective view showing a configuration example of the sub-chamber 50 according to the present embodiment. As in the case of the first embodiment, the plurality of through-holes 51 are formed in the side wall 50s of the sub-chamber 50. The plurality of through-holes 51 include the direct injection through-hole 51d (a third through-hole) in addition to the above-described first through-hole 51i. In other words, a part of the plurality of through-holes 51 is formed as the direct injection through-hole 51d. In the example shown in FIG. 10, the direct injection through-hole 51d is formed below (i.e. on the side of the piston 22) the first through-hole 51i.

Figure 11:
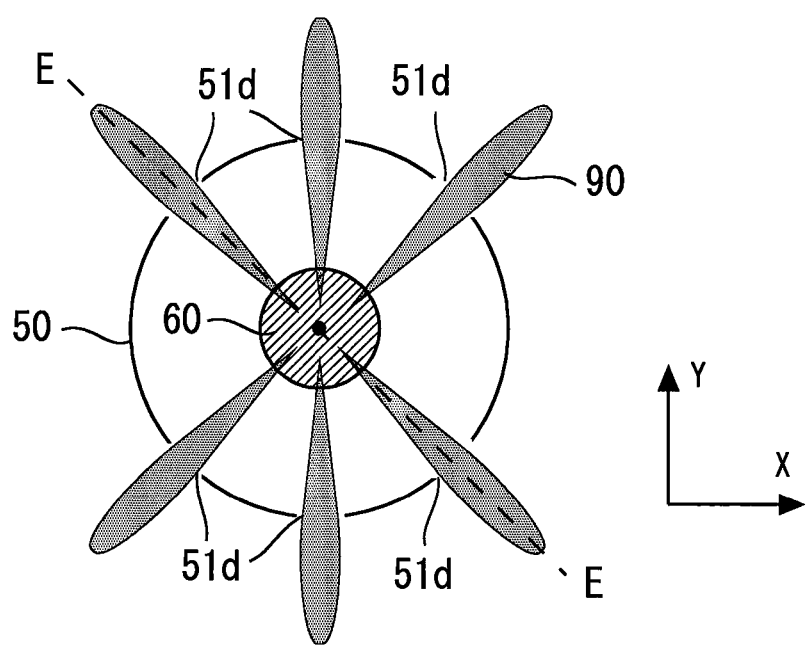
FIG. 11 is a conceptual diagram for explaining fuel injection in the sub-chamber of the internal combustion engine according to the second embodiment of the present disclosure.
Figure 12:
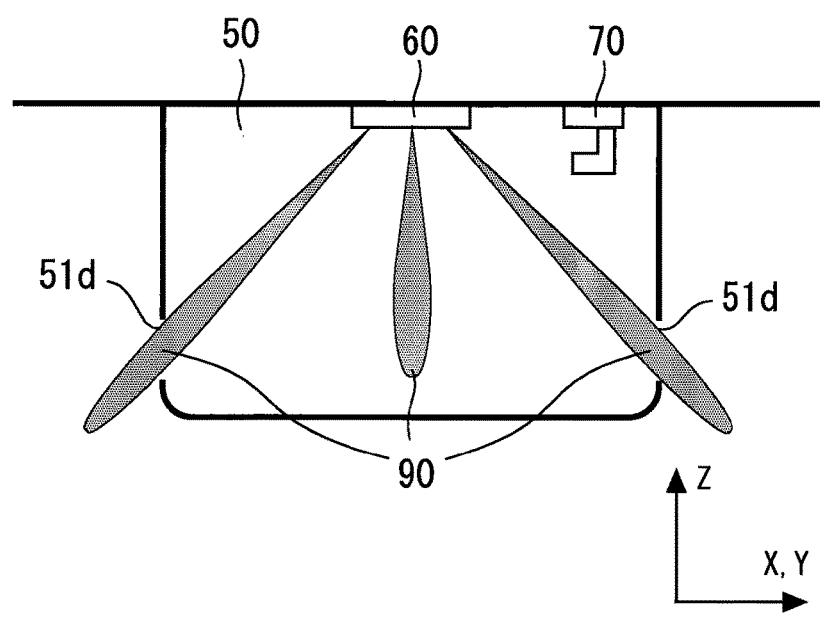
FIG. 12 is a conceptual diagram for explaining fuel injection in the sub-chamber of the internal combustion engine according to the second embodiment of the present disclosure.

FIGS. 11 and 12 are conceptual diagrams for explaining the fuel injection in the sub-chamber 50 according to the present embodiment. More specifically, FIG. 11 shows the sprayed fuel 90 injected from the fuel injector 60, together with an XY cross-section at a position of the direct injection through-hole 51*d*. FIG. 12 schematically shows a cross-sectional structure of the sub-chamber 50 along a line E-E in FIG. 11.

As shown in FIGS. 11 and 12, the direct injection through-hole 51*d* is provided such that the sprayed fuel 90 injected from the fuel injector 60 passes through the direct injection through-hole 51*d* to directly enter the main combustion chamber 10. In other words, the direct injection through-hole 51*d* is positioned in a target direction of the sprayed fuel 90. Therefore, it is possible to introduce the sprayed fuel 90 injected into the sub-chamber 50 directly to the main combustion chamber 10. Typically, the sprayed fuel 90 injected by the first fuel injection shown in FIG. 9 is directly supplied to the main combustion chamber 10 through the direct injection through-hole 51*d*.

According to the present embodiment, as described above, a part of the plurality of through-holes 51 is formed as the direct injection through-hole 51*d*. By providing the direct injection through-hole 51*d*, it is possible to supply the fuel injected into the sub-chamber 50 from the fuel injector 60 directly to the main combustion chamber 10. By using both the first through-hole 51*i* described above and the direct injection through-hole 51*d*, it is possible to further efficiently introduce the mixed gas and the fuel to the main combustion chamber 10.

3. Third Embodiment

Figure 13:
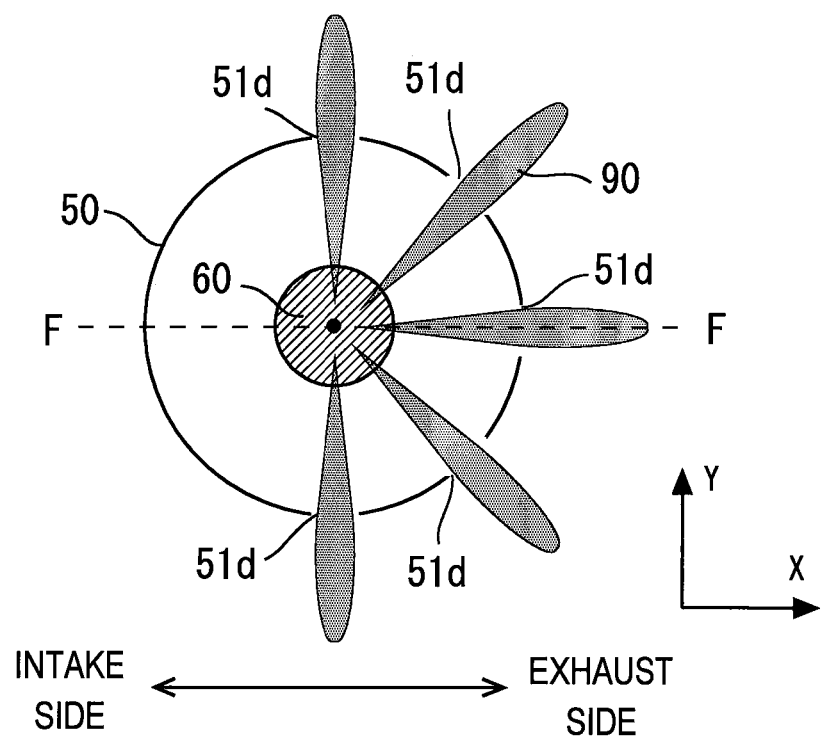
FIG. 13 is a conceptual diagram for explaining fuel injection in the sub-chamber of the internal combustion engine according to a third embodiment of the present disclosure.
Figure 14:
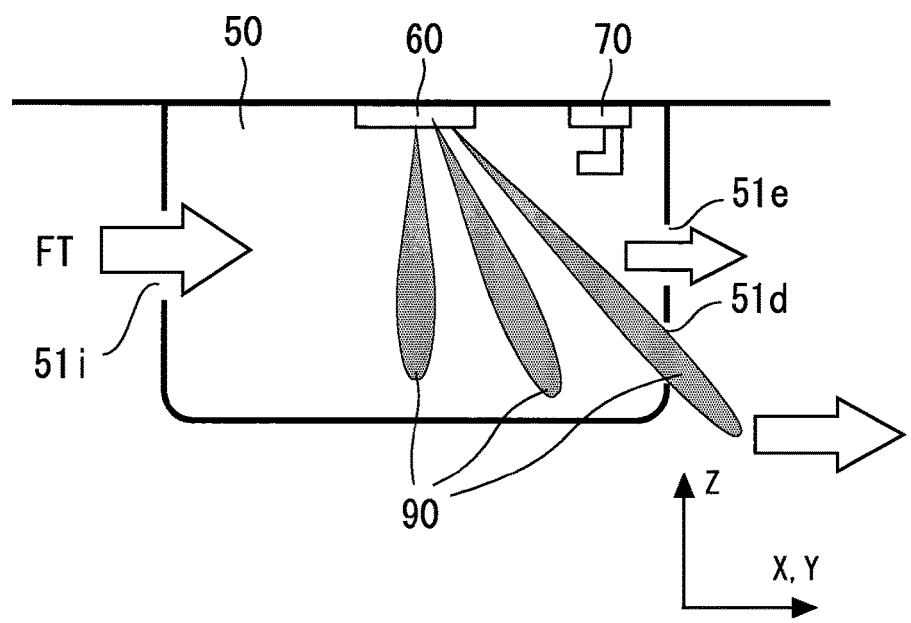
FIG. 14 is a conceptual diagram for explaining fuel injection in the sub-chamber of the internal combustion engine according to the third embodiment of the present disclosure.

FIGS. 13 and 14 are conceptual diagrams for explaining the fuel injection in the sub-chamber 50 according to a third embodiment of the present disclosure. More specifically, FIG. 13 shows the sprayed fuel 90 injected from the fuel injector 60, together with an XY cross-section at the position of the direct injection through-hole 51*d*. FIG. 14 schematically shows a cross-sectional structure of the sub-chamber 50 along a line F-F in FIG. 13.

According to the present embodiment, the fuel injection is performed efficiently in consideration of the tumble flow FT flowing from the first side to the second side. More specifically, the fuel injector 60 preferentially injects fuel to a direction of the second side over a direction of the first side. In other words, the fuel injector 60 performs the fuel injection in an asymmetrical manner such that the fuel injection concentrates in the direction of the second side.

As shown in FIG. 14, the mixed gas formed in a second side region in the sub-chamber 50 can efficiently spread to the main combustion chamber 10 due to the tumble flow FT flowing from the first side to the second side. In addition, the sprayed fuel 90 directly passing through the direct injection through-hole 51*d* on the second side can efficiently spread in the main combustion chamber 10 due to the tumble flow FT flowing from the first side to the second side.

According to the present embodiment, as described above, it is possible to efficiently perform the fuel injection, by considering the direction of the tumble flow FT flowing from the first side to the second side.

What is claimed is:

1. An internal combustion engine comprising:
a main combustion chamber sandwiched between a cylinder head and a piston facing the cylinder head;
an intake port formed within the cylinder head and connected to the main combustion chamber at an intake opening;
an exhaust port formed within the cylinder head and connected to the main combustion chamber at an exhaust opening;
a sub-chamber provided on the cylinder head between the intake opening and the exhaust opening, and connected to the main combustion chamber through a plurality of through-holes;
a fuel injector injecting fuel into the sub-chamber; and
a spark plug performing ignition in the sub-chamber, wherein
a tumble flow at a position of the sub-chamber flows from a first side to a second side as seen from the sub-chamber,
the plurality of through-holes include:
a first through-hole formed in a part on the first side of a side wall of the sub-chamber; and
a second through-hole different from the first through-hole and formed in a part on the second side of the side wall of the sub-chamber,
a diameter of the first through-hole is larger than a diameter of the second through-hole, and
the fuel injector preferentially injects fuel to a direction of the second side over a direction of the first side.

2. The internal combustion engine according to claim 1, wherein
the first through-hole and the second through-hole face each other.

3. The internal combustion engine according to claim 1, wherein
there is no fuel injector in the intake port nor in the main combustion chamber.

4. The internal combustion engine according to claim 1, wherein
the fuel injector injects fuel of a first injection amount into the sub-chamber in an intake stroke, and
the fuel injector injects fuel of a second injection amount less than the first injection amount into the sub-chamber after the intake stroke and before an ignition timing.

5. The internal combustion engine according to claim 1, wherein
the plurality of through-holes further include a third through-hole, and
the third through-hole is provided such that the fuel injected from the fuel injector passes through the third through-hole to directly enter the main combustion chamber.

6. An internal combustion engine comprising:
a main combustion chamber sandwiched between a cylinder head and a piston facing the cylinder head;
an intake port formed within the cylinder head and connected to the main combustion chamber at an intake opening;
an exhaust port formed within the cylinder head and connected to the main combustion chamber at an exhaust opening;
a sub-chamber provided on the cylinder head between the intake opening and the exhaust opening, and connected to the main combustion chamber through a plurality of through-holes;
a fuel injector injecting fuel into the sub-chamber; and
a spark plug performing ignition in the sub-chamber, wherein
the plurality of through-holes include:
a first through-hole formed in a part on a side of the intake opening of a side wall of the sub-chamber; and
a second through-hole different from the first through-hole and formed in a part on a side of the exhaust opening of the side wall of the sub-chamber,
a diameter of the first through-hole is larger than a diameter of the second through-hole, and the fuel injector preferentially injects fuel to a direction of the side of the exhaust opening over a direction of the side of the intake opening.

* * * * *